US012668672B2

(12) United States Patent
Stephens

(10) Patent No.: US 12,668,672 B2
(45) Date of Patent: Jun. 30, 2026

(54) BIO-ASSIMILATION MASTER BATCH COMPOSITION, PROCESSES FOR PRODUCING POLYMERIC BIO-ASSIMILATING MATERIAL THEREFROM, AND PRODUCTS PRODUCED THEREFROM

(71) Applicant: SMART PLASTIC TECHNOLOGIES, LLC, Buffalo Grove, IL (US)

(72) Inventor: Michael Stephens, Hereford (GB)

(73) Assignee: SMART PLASTIC TECHNOLOGIES, LLC, Wheeling, IL (US)

( * ) Notice: Subject to any disclaimer, the term of this patent is extended or adjusted under 35 U.S.C. 154(b) by 110 days.

(21) Appl. No.: 17/587,399

(22) Filed: Jan. 28, 2022

(65) Prior Publication Data

US 2022/0235184 A1     Jul. 28, 2022

Related U.S. Application Data

(60) Provisional application No. 63/142,568, filed on Jan. 28, 2021.

(51) Int. Cl.
*C08J 3/22*        (2006.01)
*C08L 23/06*      (2006.01)
*C08L 23/12*      (2006.01)

(52) U.S. Cl.
CPC .............. *C08J 3/226* (2013.01); *C08L 23/06* (2013.01); *C08L 23/12* (2013.01); *C08J 2323/06* (2013.01);
(Continued)

(58) Field of Classification Search
CPC .... C08J 3/226; C08J 2323/06; C08J 2323/12; C08J 2467/04; C08J 2323/08;
(Continued)

(56) References Cited

U.S. PATENT DOCUMENTS

| | | | |
|---|---|---|---|
| 3,935,141 A * | 1/1976 | Potts ....................... | C08L 23/10 |
| | | | 525/240 |
| 5,346,929 A | 9/1994 | Guttag | |

(Continued)

FOREIGN PATENT DOCUMENTS

| | | | |
|---|---|---|---|
| CN | 111875937 | 11/2020 | |
| CN | 111875937 A * | 11/2020 | .............. C08J 3/226 |

(Continued)

OTHER PUBLICATIONS

Lu, CN-111875937-MT (Year: 2020).*

(Continued)

*Primary Examiner* — Katarzyna I Kolb
*Assistant Examiner* — Zhen Liu
(74) *Attorney, Agent, or Firm* — CYGAN LAW OFFICES PC

(57)        ABSTRACT

A bio-assimilation master batch including a carrier resin, one or more transition metals, and one or more primary antioxidants is provided. The master batch may include one or more secondary antioxidants and one or more bioassimilation promoting additives. A process for producing polymeric bio-assimilating material including creating a master batch, mixing the master batch with a host polymer to form an end-use polymer mixture, and introducing the end-use polymer mixture to a polymer processing device to manufacture a polymer-based article. Products produced from a process for producing polymeric bio-assimilating material including creating a master batch, mixing the master batch with a host polymer to form an end-use polymer mixture, (Continued)

100 — Mixing Additives into a Carrier Resin to form a Masterbatch

102 — Mixing the Masterbatch with a Host Polymer to form an End-Use Polymer Mixture 104 — Introducing the End-Use Polymer Mixture into a Polymer Processing Device to Create a Polymer-Based Article and introducing the end-use polymer mixture to a polymer processing device to manufacture a polymer-based article.

2 Claims, 1 Drawing Sheet

(52) U.S. Cl.
CPC ........ *C08J 2323/12* (2013.01); *C08J 2467/04* (2013.01); *C08L 2310/00* (2013.01)

(58) Field of Classification Search
CPC ... C08J 2423/06; C08J 2423/08; C08L 23/06; C08L 23/12; C08L 2310/00; C08L 23/04
See application file for complete search history.

(56) References Cited

U.S. PATENT DOCUMENTS

| | | | |
|---|---|---|---|
| 7,842,748 B2 | 11/2010 | Takebe et al. | |
| 8,026,301 B2 * | 9/2011 | Sumanam | C08K 3/24 |
| | | | 435/257.1 |
| 8,916,634 B2 | 12/2014 | Ohashi et al. | |
| 9,181,412 B2 | 11/2015 | Rendon | |
| 10,363,546 B2 * | 7/2019 | Song | B01J 20/18 |
| 10,550,255 B2 | 2/2020 | Lee et al. | |
| 10,570,263 B2 | 2/2020 | Wallis et al. | |
| 10,717,828 B2 | 7/2020 | Gabbay | |
| 11,155,702 B2 | 10/2021 | Chapman et al. | |
| 11,359,088 B2 * | 6/2022 | Allen | C08G 63/183 |
| 2005/0250890 A1 | 11/2005 | Chen et al. | |
| 2008/0103232 A1 * | 5/2008 | Lake | C08L 101/16 |
| | | | 523/124 |
| 2011/0200771 A1 | 8/2011 | Barclay | |
| 2018/0208753 A1 * | 7/2018 | Lau | B29B 7/88 |
| 2019/0309147 A1 | 10/2019 | Chapman et al. | |
| 2019/0352476 A1 | 11/2019 | Wallis et al. | |
| 2020/0239673 A1 * | 7/2020 | Ssubramaniam | C08L 23/0815 |
| 2020/0332111 A1 | 10/2020 | Rapthel et al. | |

FOREIGN PATENT DOCUMENTS

| | | |
|---|---|---|
| WO | 2011155814 A1 | 12/2011 |
| WO | 2019067239 | 4/2019 |

OTHER PUBLICATIONS

Dussud, Claire, et al., "Colonization of Non-biodegradable and Biodegradable Plastics by Marine Microorganisms", Front. Microbiol., Jul. 18, 2018.
"Standard Guide for Exposing and Testing Plastics that Degrade in the Environment by a Combination of Oxidation and Biodegredation", ASTM D6954-18.
"Standard Test Method for Determining Anaerobic Biodegredation of Plastic Materials Under Accelerated Landfill Conditions", ASTM D5526-18.
Jakubowicz, Ignacy, et al., "Kinetics of Abiotic and Biotic Degradability of Low-density Polyethylene Containing Prodegradant Additives and its Effect on the Growth of Microbial Communities", Polymer Degradation and Stability 96 (2011) 919-928.
International Search Report, PCT App. No. PCT/US22/70416 (Apr. 11, 2022).
Written Opinion of the International Searching Authority, PCT App. No. PCT/US22/70416 (Apr. 11, 2022).
Bio Calcium Carbonate Masterbatch—An Effective Solution for Manufacturers and the Environment—CACO3 Masterbatch. "Plascal". http://plascal.net/bio-calcium-carbonate-masterbatch-an-effective-solution-for-manufacturers-and-the-environment/. Sep. 16, 2019; title, p. 2, top; p. 3, bottom.
LMPE Bio-assimilation Final Report (13C-Labeled Polyethylene Study) (Sep. 2, 2019-Apr. 23, 2021).
SEVAR Durability & Accelerated Aging Report (Apr. 28, 2021).
Intertek Anaerobic Landfill Biodegradation (ASTM D5526, 24 Months) (May 22, 2025).
Certification of a Translation of CN111875937A, Clarivate, Sep. 17, 2025.

* cited by examiner

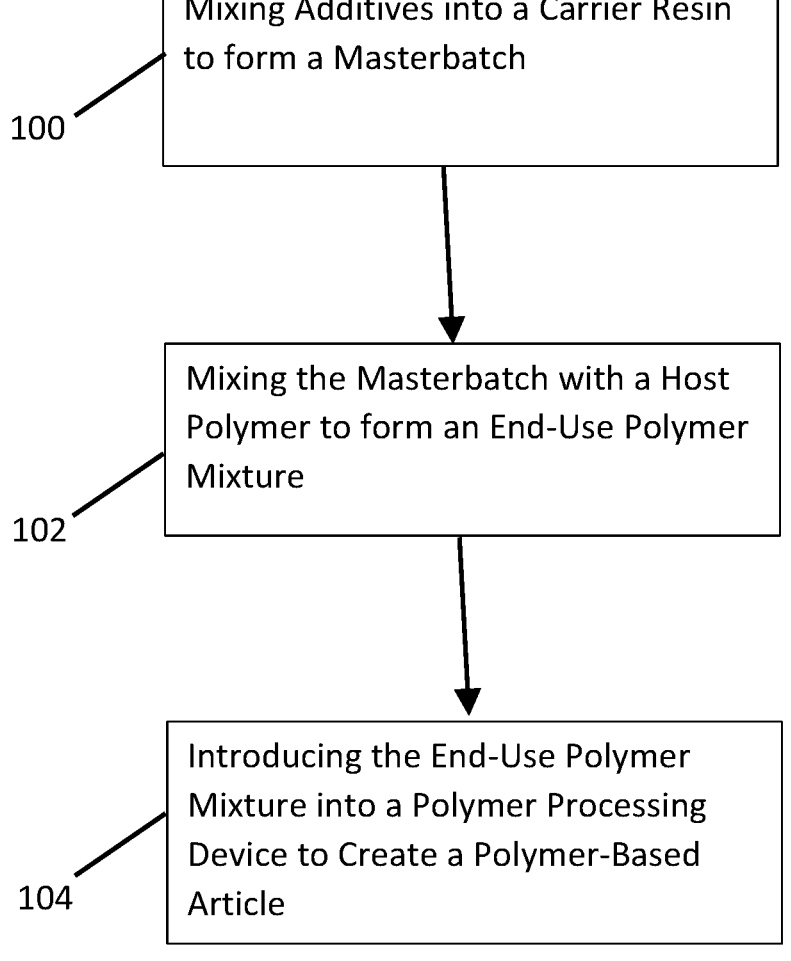
100 — Mixing Additives into a Carrier Resin to form a Masterbatch
102 — Mixing the Masterbatch with a Host Polymer to form an End-Use Polymer Mixture
104 — Introducing the End-Use Polymer Mixture into a Polymer Processing Device to Create a Polymer-Based Article

BIO-ASSIMILATION MASTER BATCH COMPOSITION, PROCESSES FOR PRODUCING POLYMERIC BIO-ASSIMILATING MATERIAL THEREFROM, AND PRODUCTS PRODUCED THEREFROM

CROSS-REFERENCE(S) TO RELATED APPLICATION(S)

This application is a nonprovisional application which claims priority to U.S. Provisional Patent Application No. 63/142,568 entitled "BIO-ASSIMILATION MASTER BATCH COMPOSITION, PROCESSES FOR PRODUCING POLYMERIC BIO-ASSIMILATING MATERIAL THEREFROM, AND PRODUCTS PRODUCED THEREFROM" filed on Jan. 28, 2021, the entirety of which is hereby incorporated herein by reference.

FIELD

This disclosure relates to the field of bio-assimilating polymers. More particularly, this disclosure relates to bio-assimilation masterbatches, processes for producing polymeric bio-assimilating material from such bio-assimilation masterbatches, and products produced using bio-assimilation masterbatches.

BACKGROUND

Plastics have seen momentous growth since the middle of the twentieth century driven by their broad property spectrum and cost effectiveness. They have penetrated all aspects of modern life from the replacement of traditional engineering materials to improving convenience and economics in consumer applications. Their durability, stability and hydrophobicity are key to their success but in many situations, especially short-term flexible packaging applications, these issues can lead to environmental consequences.

Polyethylene (PE) dominates the flexible film market representing 75-85% of global tonnage. Low Density Polyethylene (LDPE) is the material of choice for commodity applications such as sacks, refuse bags, agricultural and construction films as well as consumer packaging films including shrink, stretch and collation wrapping.

LDPE films provide clarity, printability and good balance of strength and toughness even at low temperatures. The properties can be further enhanced by blending LDPE with Linear Low Density (LLDPE), High Density (LDPE), metallocene (mPE) or other ethylene copolymers or by resorting to multilayer coextruded films.

However, plastic waste is a serious environmental concern and flexible packaging have few mitigation strategies beyond collection for landfill and energy recovery. According to recent Environmental Protection Agency figures, 16 MT of single use packaging or food service plastics were consumed in the USA in 2019, with 50% being attributable to polyethylene in its various forms.

Polyethylene is not biodegradable and only about 12% of single use and food service plastics is recycled in the USA. The bulk of this stream is limited to rigid containers such as HDPE bottles which are easier and more economical to re-process than low bulk density film waste. If the film waste is contaminated with other plastics or food waste, then recycling is largely impractical.

Flexible polyolefin packaging remains a recycling challenge both from a collection and processing perspective; the majority is destined for landfill or energy recovery, which is undesirable given the pressures on landfill capacity. Given the scale it is inevitable that some polyethylene waste will reach the open environment where it can find its way into rivers and the sea, posing a nuisance and hazard on both the macro and micro scale.

Biodegradable, compostable alternatives have been developed to address these issues. Thermoplastic polyester copolymers based on lactides (PLA), hydroxyalkanoates (PHA) and succinic acid (PBS) as well as starch derivatives all have niche applications, but such materials are typically 2-3 times the cost of polyethylene. They biodegrade by hydrolysis, but this is only effectively achieved if they are collected and diverted to industrial composting plants. The propensity to hydrolyse also places limitations on their durability and they cannot be considered universal replacements for polyethylene.

What is needed, therefore, is a way to prepare a polyolefin mixture to produce end-use polyolefin-based polymer products that maintain their structural integrity during the normal lifespans of the products but that readily biodegrade if such products are discarded in either an environment exposed to light and oxygen or an environment with little or no light and little or no oxygen.

SUMMARY

This disclosure addresses the biodegradable recalcitrance of polyolefins such as, for example, polyethylene, including its various copolymers, blends and mixtures by incorporating chemical additives that transform the polymer into low molecular weight, hydrophilic intermediates. These intermediates, once formed, undergo enzymatic bio-assimilation by microbial communities found in the open environment. These biochemical reactions progress along both anabolic and catabolic pathways. In the former the transformed intermediates provide a source for cell growth and colony expansion, while the latter process provides energy for cellular activity, yielding carbon dioxide and water as byproducts of respiration. These processes transfer the inherent carbon in the polyolefin, both virgin and recycled hydrocarbon, into the natural background of the environment.

The abiotic transformation step can occur in any terrestrial, fluvial, or marine setting where oxygen is present. It is irreversible and progressive once initiated. In this context the invention follows the principles described by ASTM 6954-18: Standard Guide for exposing and testing plastics that degrade in the environment by a combination of oxidation and bio-assimilation.

Additionally, the additive formulation contains intrinsically biodegradable polymers that are designed to enhance bio-assimilation in anaerobic conditions such as encountered within landfill and described in ASTM D5526-18: Standard Test Method for determining anaerobic biodegradation of plastic materials under accelerated landfill conditions and/or ASTM 5511-12: Standard Test Method for Determining Anaerobic Biodegradation of Plastic Materials.

In a preferred embodiment, a bio-assimilation masterbatch is used to transform the polyethylene structure into low molecular weight, hydrophilic intermediates that will subsequently undergo microbial bio-assimilation in both aerobic and anaerobic environments. This process transfers the inherent carbon in the polyolefin, both virgin and recycled hydrocarbon, into the natural background of the environment. A significant amount of this carbon is utilized in cell wall growth and the creation of biomass.

In another aspect, embodiments of the disclosure provide a method to render non-biodegradable polyolefin articles biodegradable by inclusion of a bio-assimilation masterbatch which contains functional ingredients, formulated to transform the polyolefin structure into low molecular weight, hydrophilic intermediates that will subsequently undergo microbial bio-assimilation in both aerobic and anaerobic environments. This transfers the inherent carbon in the polyolefin, both virgin and recycled hydrocarbon, into the natural background of the environment. A significant amount of this carbon is utilized in cell wall growth and the creation of biomass.

In yet another aspect, embodiments of the disclosure provide specific products produced using a method to render non-biodegradable polyolefin articles biodegradable by inclusion of a bio-assimilation masterbatch which contains functional ingredients, formulated to transform the polyethylene structure into low molecular weight, hydrophilic intermediates that will subsequently undergo microbial bio-assimilation in both aerobic and anaerobic environments. This transfers the inherent carbon in the polyolefin, both virgin and recycled hydrocarbon, into the natural background of the environment. A significant amount of this carbon is utilized in cell wall growth and the creation of biomass.

Thus, provided herein is a master batch composition comprising from about 80 wt % to about 95 wt % of a carrier resin; from about 20 ppm to about 500 ppm of one or more one or more transition metals; from about 10 ppm to about 1000 ppm of one or more primary antioxidants; and from about 3 wt % to about 15 wt % of one or more bio-assimilation promoting additives. The master batch composition preferably further comprises from about 50 ppm to about 1000 ppm of one or more secondary antioxidants. Additionally or alternatively, the carrier resin further comprises one or more mineral fillers which make up from about 15 wt % to about 40 wt/% of the master batch. The carrier resin is preferably Low Density Polyethylene (LDPE), Linear Low Density Polyethylene LLDPE, or suitable blends thereof. In another embodiment, the carrier resin is polypropylene. The one or more transition metals preferably include cobalt, manganese, iron, copper, cerium, vanadium, titanium, nickel, or combinations thereof. The one or more primary antioxidants are preferably one or more phenolic based stabilizers. The one or more secondary antioxidants are preferably one or more phosphite based stabilizers. The one or more mineral fillers are preferably bio-based $CaCO_3$. The one or more bio-assimilation promoting additives are preferably ethylene vinyl acetate (EVA), polycaprolactone (PCL), Polylactic acid (PLA), Polyhydroxybutyrate (PHB), Polyhydroxyalkanoates (PHA), polybutylene adipate terephthalate, 2-Hydroxypropane-1,2,3-tricarboxylic acid, polybutylene succinate, or combinations thereof.

In a preferred embodiment, a master batch is disclosed which consists essentially of from about 80 wt/% to about 95 wt/% weight percent of a carrier resin wherein the carrier resin is selected from the group consisting of Low Density Polyethylene (LDPE), Linear Low Density Polyethylene LLDPE, and suitable blends thereof; from about 20 ppm to about 500 ppm of one or more one or more transition metals wherein the one or more transition metals is a member selected from the group consisting of cobalt, manganese, iron, copper, cerium, vanadium, titanium, nickel, and combinations thereof; from about 10 ppm to about 1000 ppm of one or more primary antioxidants; from about 50 ppm to about 1000 ppm of one or more secondary antioxidants; and from about 3 wt % to about 15 wt % of one or more bio-assimilation promoting additives. The one or more primary antioxidants are preferably one or more phenolics. The one or more secondary antioxidants are preferably one or more phosphites. The carrier resin preferably comprises from about 15 wt/% to about 40 wt/% of one or more mineral fillers.

In yet another preferred embodiment, a master batch composition is disclosed consisting of from about 80 wt/% to about 95 wt/% weight percent of a carrier resin wherein the carrier resin is a member selected from the group consisting of Low Density Polyethylene (LDPE), Linear Low Density Polyethylene LLDPE, and suitable blends thereof; from about 20 ppm to about 500 ppm of one or more one or more transition metals wherein the one or more transition metals is a member selected from the group consisting of cobalt, manganese, iron, copper, cerium, vanadium, titanium, nickel, and combinations thereof; from about 10 ppm to about 1000 ppm of one or more primary antioxidants; from about 50 ppm to about 1000 ppm of one or more secondary antioxidants; and from about 3 wt % to about 15 wt % of one or more bio-assimilation promoting additives selected from the group consisting of ethylene vinyl acetate (EVA), polycaprolactone (PCL), Polylactic acid (PLA), Polyhydroxybutyrate (PHB), Polyhydroxyalkanoates (PHA), polybutylene adipate terephthalate, 2-Hydroxypropane-1,2,3-tricarboxylic acid, polybutylene succinate, and combinations thereof.

In another aspect, a process of manufacturing a polymer-based article is disclosed, the process comprising (1) mixing a plurality of additives with a carrier resin to form a masterbatch comprising (a) from about 80 to about 95 weight percent of a carrier resin; (b) from about 20 ppm to about 500 ppm of one or more one or more transition metals; (c) from about 10 ppm to about 1000 ppm of one or more primary antioxidants; (d) from about 3 wt % to about 15 wt % of one or more bio-assimilation promoting additives; and (2) mixing the master batch with a host polymer to form an end-use polymer. The process preferably further comprises introducing the end-use polymer mixture into a polymer processing device to form the polymer-based article. In the process, the carrier resin is preferably a member selected from the group consisting of Low Density Polyethylene (LDPE), Linear Low Density Polyethylene LLDPE, and suitable blends thereof. In another embodiment, the carrier resin is polypropylene. In the process, the one or more transition metals are preferably a member selected from the group consisting of cobalt, manganese, iron, copper, cerium, vanadium, titanium, nickel, and combinations thereof. In the process, the one or more primary antioxidants are preferably one or more phenolics. In the process, the master batch preferably further comprises from about 50 ppm to about 1000 ppm of one or more secondary oxidants including phosphites. In the process, the carrier resin preferably further comprises one or more mineral fillers which make up from about 15 wt/% to about 40 wt/% of the master batch. In the process, the one or more bio-assimilation promoting additives members are preferably selected from the group consisting of ethylene vinyl acetate (EVA), polycaprolactone (PCL), Polylactic acid (PLA), Polyhydroxybutyrate (PHB), Polyhydroxyalkanoates (PHA), polybutylene adipate terephthalate, 2-Hydroxypropane-1,2,3-tricarboxylic acid, polybutylene succinate, and combinations thereof. In the process, the polymer processing device is preferably a member selected from the group consisting of a device for making polymer films, a device for making polymer sheets, an extrusion blow molding device, an injection blow molding device, and an injection molding devices.

In another aspect, a polymer-based article produced according to the process embodiments described above is disclosed. The polymer-based article preferably comprises a member selected from the group consisting of a polymer film, a polymer sheet, a bottle, a food container, and a piece of furniture.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figure(s), wherein elements are not to scale so as to more clearly show the details, wherein like reference numbers indicate like elements throughout the several views, and wherein:

FIG. 1 shows a flowchart of an end-use polymer manufacturing process;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

It is well established that polymers will eventually degrade when subjected to an oxidizing environment. Whether this is problematic or not depends on the anticipated service life and purpose of the article, the polymer type and composition, the dimensions and form of the article, the conditions of exposure, and any mitigation strategies attempted by way of protection.

It is also known that certain chemical species can accelerate the degradation reaction, while conversely, other species can have a preserving effect.

In this disclosure use is made of the propensity for polyolefin polymers such as, for example, polyethylene to degrade, but to control the process such that it enables the product to fulfil its primary application, be suitable for recycling by those methods that exist, but to also undergo rapid bio-transformation if disposed in the open environment, as would be the case through littering.

The challenge has been to have polyolefin-based products that function well while in use but then biodegrade rapidly when discarded in any type of waste environment, whether aerobic or anaerobic. The various embodiments described herein accomplish that task.

Thus, provided herein are masterbatches and methods of preparing masterbatches that comprise one or more bio-assimilation promoting additives and one or more antioxidants. Examples of the one or more bio-assimilation promoting additives include, but are not limited to, ethylene vinyl acetate (EVA), polycaprolactone (PCL), polylactic acid (PLA), polyhydroxybutyrate (PHB), polyhydroxyalkanoates (PHA), polybutylene adipate terephthalate, 2-Hydroxypropane-1,2,3-tricarboxylic acid, and polybutylene succinate. Examples of the one or more antioxidants include, but are not limited to, phenolic based stabilizers phenolic based stabilizers and phosphite based stabilizers. The use and the amount of the bio-assimilation promoting additives and antioxidants can be adjusted based on structural and degradation needs of a polymer-based article; i.e., the bio-assimilation promoting additive and antioxidant (1) preserve the structural integrity of the article for its typical usable life and (2) provide the necessary chemistry in the article so it rapidly biodegrades after it has been discarded.

Hydrocarbon polymers, including polyolefins such as polyethylene and polypropylene are susceptible to degradation initiated by free radical processes in the presence of molecular oxygen. In this scheme an alkyl free radical ($R_1\bullet$) reacts with oxygen to produce peroxide free radicals ($R_1O_2\bullet$)

$$R_1\bullet + O_2 \rightarrow R_1O_2\bullet \qquad \text{Equation 1:}$$

This process is known as peroxidation or auto-oxidation and for polyolefins the sequence of vulnerability depends on the ease of hydrogen abstraction from a carbon-hydrogen bond on the polymer chain. Polypropylene is more susceptible than polyethylene because of the ease of abstraction from a tertiary carbon. Stability within the polyethylene family follows the sequence High Density (HDPE) >Linear Low Density (LLDPE) >Low Density (LDPE) since greater branching within the polymer increases the preponderance of tertiary carbon atoms.

Once initiated, propagation ensues with the peroxide free radical abstracting more hydrogen atoms to form further alkyl free radicals ($R_2\bullet$) as well as unstable hydroperoxides ($R_1OOH$). This step occurs slowly and is rate determining for the transformation sequence.

$$R_1O_2\bullet + R_2H \rightarrow R_1OOH + R_2\bullet \qquad \text{Equation 2:}$$

Free radical hydroperoxides decompose to form two highly reactive species: a peroxy radical ($R_1O\bullet$) and a hydroxy radical ($OH\bullet$).

$$R_1OOH \rightarrow R_1O\bullet + OH\bullet \qquad \text{Equation 3:}$$

These free radicals feed into the propagation cycle. In this manner the polymer chain is progressively cleaved and irreversibly transformed into low molecular weight, hydrophilic, biodegradable species.

Molecular weight progressively decreases from initial values of >100,000 Daltons, and oxygen atoms substituted into the resulting polymeric fractions result in increased hydrophilicity, which allows film forming microbes to colonize the surfaces of the intermediates.

Abiotic transformation is influenced by both temperature and UV radiation and follows Arrhenius kinetics. A 10° C. rise in temperature will generally increase the rate of abiotic peroxidation by a factor of between 2 to 3. Polyethylene is particularly susceptible to peroxidation when exposed to outdoor sunlight, which is a beneficial in the context of this disclosure.

In this disclosure use is made of transition metal ions to catalyze the decomposition of the hydroperoxides. Transition metals with multiple oxidation states are highly effective hydroperoxide decomposers (Scott: Degradation of carbon chain polymers. Degradable Polymers (2002)). The preferred transition metals used in this disclosure include one or more of cobalt, manganese, iron, copper, cerium, vanadium, titanium, and nickel. In the presence of metal ions hydroperoxide decomposition proceeds according to the sequence:

$$ROOH + M^+ \rightarrow M^{++} + RO\bullet + OH^- \qquad \text{Equation 4:}$$

$$ROOH + M^{++} \rightarrow M^+ + ROO\bullet + OH^- \qquad \text{Equation 5:}$$

The concentration of metal ions influences the rate of hydroperoxide decomposition. In this disclosure the transition metal ion inclusion rate in the polymer will depend on the precise metal ion and is in the range of 20-500 ppm.

The transition metals are typically incorporated into the polymer composition as the carboxylate salts of carboxylic acids. The carboxylic acids may be unsaturated, saturated, mono, di or tri functional according to the general formula $M(RCOO)_n$ where M represents the metal ion.

A key feature of the disclosed technology is the ability to inhibit the rate of peroxide decomposition and in so doing to moderate the rate of polymer degradation. Stabilization of polyethylene is well understood (Krohnke and Werner, Stabilisers for Polyethylene, Rapra Review Report 132 (2001)).

In this disclosure use is made of specific antioxidants to control the life of the polymer article. Stabilization additives are progressively depleted by reaction with free radicals and ultimately will be totally consumed. At this point the transformation of the polymer to biodegradable intermediates will be rapid and unhindered.

Chain breaking or primary antioxidants (AH) limit hydrogen abstraction by preferentially reacting with peroxide free radicals to produce less reactive free radicals and more stable intermediates.

$$RO_2\bullet + AH \rightarrow ROOH + A\bullet \qquad \text{Equation 6:}$$

$$A\bullet + RO_2\bullet \rightarrow AOOR \qquad \text{Equation 7:}$$

Suitable candidates include hindered phenolic compounds which are primary antioxidants that function by scavenging peroxy radical intermediates in the oxidation process. They are effective over a wide range of temperatures and provide protection during melt processing, end use, and long-term storage. As processing stabilizers, hindered phenols serve to minimize changes in melt viscosity and reduce discoloration. During end use at elevated temperatures, hindered phenols can reduce discoloration and also improve the retention of useful mechanical properties. Some hindered phenols also contribute to the light stability of plastics. Partially-hindered phenols have the highest reactivity with peroxy radicals such as, for example, Octadecyl 3-(3,5-di-tert-butyl-4-hydroxyphenyl)propionate, available for example from CIBA Chemicals as Irganox 1076. Other suitable candidates include secondary aromatic amines having two organic substituents (alkyl, aryl or both) bound to the nitrogen together with one hydrogen.

One example is dimethylamine. Hindered phenolic stabilizer compounds are preferred since they are readily deactivated by exposure to ultraviolet light, ensuring that the polymer article will readily undergo bio-transformation if discarded in the open environment.

One or more primary antioxidants are included in the polymer formulation at between 10-1000 ppm.

Further protection of the polymer is provided by a secondary class of antioxidant which acts to decompose the hydroperoxides (Equation 3) into stable species.

$$ROOH + A \rightarrow ROH + AO \qquad \text{Equation 8:}$$

Typical secondary antioxidants considered in this disclosure include trivalent phosphite compounds and thioesters. One or more secondary antioxidants are included in the polymer formulation at between 50-1000 ppm.

In practice the antioxidants are combined as a synergistic package optimized for the required life and service condition of the article.

A further feature of the disclosure is that the formulation contains bio-assimilation promoting additives that are included to modify the polymer morphology and seed the microbial communities. These help to establish the bio-assimilation process, ensuring more rapid and complete biodegradation and bio assimilation of the residues. Amongst others, typical bio-assimilation promoting additives include ethylene vinyl acetate (EVA), where the vinyl acid content is typically in the range of 5-40% wt/%, and intrinsically biodegradable polymers such as polycaprolactone (PCL), Polylactic acid (PLA), Polyhydroxybutyrate (PHB) and Polyhydroxyalkanoates (PHA). Other bio-assimilation promoting additive candidates include polybutylene adipate terephthalate, 2-Hydroxypropane-1,2,3-tricarboxylic acid, and polybutylene succinate.

A further additional feature of the additive is the inclusion of mineral fillers into the additive composition. Such candidates include calcium carbonate and titanium dioxide. Other similar fillers may also be used such as talc, silica, wollastonite, clay, calcium sulfate fibers (also known as Franklin fiber), mica, glass beads, and alumina trihydrate.

It is established in the literature that polyethylene transformed into low molecular weight (<5000 Daltons) hydrophilic products are capable of undergoing bio-assimilation.

Biodegradation testing in soil (Jakoubuwicz, Polymer Degradation and Stability, (2011)) has demonstrated bio transformation rates more than 90% for LDPE film. Rose (International. Journal of Molecular Science, 2020) has demonstrated the ability of the common soil microorganism *Rhodococcus rhodochrous* and marine organism *Alcanivorax borkumensis* to biodegrade LDPE residues. Work by Dussud (Frontiers in Microbiology, 2018) demonstrated a greater abundance and diversity of microbial species on transformed LDPE polymer residues than on the un-treated, control sample after six weeks exposure in a marine environment. Bio-assimilation validation of this technology was demonstrated by Lucia Pérez Amaro et al. in the following exercise: Development of an Innovative Protocol to Detect the Biodegradation Propensity of Mass Plastic; Bio-assimilation of Oxidatively Fragmented C13 Labelled HDPE by *Rhodococuss Tuber*. Poly-Char 2021 (Venice) Apr. 12-16th 2021.

For convenience, the active ingredients are formulated within a suitable polymer carrier resin to produce a bio-assimilation masterbatch that can be introduced into the polymer at the point of conversion to the final article.

The carrier resin is preferably Low Density polyethylene (LDPE), Linear Low Density Polyethylene LLDPE with densities in the range 0.910-0.0940 g/cm$^3$ or suitable blends thereof. However, other polyolefins can be used. In an alternative embodiment, the carrier resin is polypropylene. Production of the masterbatch is performed in the melt phase on a suitable mixing machine such as a twin screw co-rotating compounding extruder or continuous internal mixer to ensure homogenous dispersion and distribution of the components within the polyethylene carrier resin.

Preferably, the masterbatch composition comprises from about 80% to about 95% by weight LDPE, LLDPE, or blends thereof as a carrier resin. A portion of the carrier resin may include one or more mineral fillers making up from about 15 wt % to about 40 wt % of the masterbatch. The masterbatch composition preferably further includes from about 20 to about 500 ppm of one or more transition metals including cobalt, manganese, iron, copper, cerium, vanadium, titanium, and nickel. The masterbatch composition preferably further includes one or more primary antioxidant(s) at from about 10 to about 1000 ppm. The primary antioxidant(s) preferably include hindered phenolic compounds such as Pentaerythritol tetrakis(3-(3,5-di-tertbutyl-4-hydroxyphenyl)propionate) for example Irganox 1010 from Ciba Chemicals. Additionally or alternatively, the primary antioxidant(s) may include secondary aromatic amines such as dimethylamine. The masterbatch composition preferably further includes one or more secondary antioxidant(s) at from about 50 to about 1000 ppm. The secondary antioxidant(s) may include, for example, Tris(2,4-di-tert-butylphenyl)phosphite often branded as Irgafos 168 from CIBA Chemicals. The masterbatch preferably further includes one or more bio-assimilation promoting additives preferably ranging from about 3 wt % to about 15 wt %.

In a preferred embodiment, the masterbatch comprises about 85 wt % carrier resin (which includes from about 15 wt % to about 40 wt % mineral filler(s)), from about 3 wt % to about 6 wt % PCL, from about 3 wt % to about 6 wt % EVA, and from about 2 wt % to about 5 wt % Manganese Stearate.

In an aspect, provided herein is a master batch composition comprising a carrier resin, one or more transition metals, one or more primary antioxidants, and one or more bio-assimilation promoting additives.

In another aspect, provided herein is a master batch composition comprising from 80 wt % to 95 wt % of a carrier resin, from 20 ppm to 500 ppm of one or more transition metals, from 10 to 1000 ppm of one or more primary antioxidants, and from 3 wt % to 15 wt % of one or more bio-assimilation promoting additives. In an embodiment, provided herein is a master batch comprising from 87 wt % to 93 wt % of a carrier resin, from 1 wt % to 5 wt % of one or more transition metals, from 0.3 wt % to 0.7 wt % of one or more primary antioxidants, and from 3 wt % to 8 wt % of one or more bio-assimilation promoting additives. In another embodiment, provided herein is a master batch composition comprising about 89 wt % or about 91 wt % of a carrier resin, about 2 wt % or about 4 wt % of one or more transition metals, about 0.5 wt % of one or more primary antioxidants, and about 6 wt % of one or more bio-assimilation promoting additives. In yet another embodiment, the master batch comprises an optional secondary antioxidant.

In yet another aspect, provided herein is a master batch comprising a carrier resin, one or more transition metals, one or more primary antioxidants, and one or more bio-assimilation promoting additives, wherein the one or more bio-assimilation promoting additives are selected from the group consisting of ethylene vinyl acetate (EVA), polycaprolactone (PCL), Polylactic acid (PLA), Polyhydroxybutyrate (PHB), Polyhydroxyalkanoates (PHA), polybutylene adipate terephthalate, 2-Hydroxypropane-1,2,3-tricarboxylic acid, polybutylene succinate, and combinations thereof. In an embodiment, the one or more primary antioxidants are selected from a phenolic based stabilizer. The master batch composition can also include a secondary antioxidants selected from the group consisting of phosphite based stabilizers.

In still another embodiment, provided herein is a master batch comprising a carrier resin, one or more transition metals, pentaerythritol tetrakis(3-(3,5-di-tert-butyl-4-hydroxyphenyl)propionate), tris(2,4-di-tert.-butylphenyl) phosphite, polycaprolactone ($(C_6H_{10}O_2)_n$), and ethylene vinyl acetate ($(C_2H_4)_n(C_4H_6O_2)_m$).

In an aspect, provided herein is a master batch comprising low density polyethylene, manganese stearate ($C_{36}H_{70}O_4Mn$), pentaerythritol tetrakis(3-(3,5-di-tert-butyl-4-hydroxyphenyl)propionate), tris(2,4-di-tert.-butylphenyl) phosphite, polycaprolactone ($(C_6H_{10}O_2)_n$), and ethylene vinyl acetate ($(C_2H_4)_n(C_4H_6O_2)_m$). In an embodiment, provided herein is a master batch comprising about 89 wt % low density polyethylene, about 4 wt % manganese stearate ($C_{36}H_{70}O_4Mn$), about 0.5 wt % pentaerythritol tetrakis(3-(3,5-di-tert-butyl-4-hydroxyphenyl)propionate), about 0.5 wt % tris(2,4-di-tert.-butylphenyl) phosphite, about 3 wt % polycaprolactone ($(C_6H_{10}O_2)_n$), and about 3 wt % ethylene vinyl acetate ($(C_2H_{4n}(C_4H_6O_2)_m$).

In an aspect, provided herein is a master batch comprising polypropylene, cobalt stearate ($C_{36}H_{70}O_4Co$), pentaerythritol tetrakis(3-(3,5-di-tert-butyl-4-hydroxyphenyl)propionate), tris(2,4-di-tert.-butylphenyl) phosphite, polycaprolactone ($(C_6H_{10}O_2)_n$), and ethylene vinyl acetate ($(C_2H_4)_n(C_4H_6O_2)_m$). In an embodiment, provided herein is a master batch comprising about 91 wt % polypropylene, about 2 wt % cobalt stearate ($C_{36}H_{70}O_4Co$), about 0.5 wt % pentaerythritol tetrakis(3-(3,5-di-tert-butyl-4-hydroxyphenyl)propionate), about 0.5 wt % tris(2,4-di-tert.-butylphenyl) phosphite, about 3 wt % polycaprolactone ($(C_6H_{10}O_2)_n$), and about 3 wt % ethylene vinyl acetate ($(C_2H_4)_n(C_4H_6O_2)_m$).

In another aspect, provided herein is a master batch composition comprising a carrier resin, one or more transition metals, one or more primary antioxidants, and one or more bio-assimilation promoting additives.

In yet another aspect, provided herein is a master batch composition comprising from 80 wt % to 95 wt % of a carrier resin, from 20 ppm to 50,000 ppm of one or more transition metals, from 10 to 10,000 ppm of one or more primary antioxidants, and from 3wt % to 15 wt % of one or more bio-assimilation promoting additives. In an embodiment, provided herein is a master batch comprising from 87 wt % to 93 wt % of a carrier resin, from 10,000 ppm to 50,000 ppm of one or more transition metals, from 0.3 wt % to 0.7 wt % of one or more primary antioxidants, and from 3 wt % to 8 wt % of one or more bio-assimilation promoting additives. In another embodiment, provided herein is a master batch composition comprising about 89 wt % or about 91 wt % of a carrier resin, about 2 wt % or about 4 wt % of one or more transition metals, about 0.5 wt % of one or more primary antioxidants, and about 6 wt % of one or more bio-assimilation promoting additives. In yet another embodiment, the master batch comprises an optional secondary antioxidant.

In yet another aspect, provided herein is a master batch comprising from 80 wt % to 95 wt % of a carrier resin, from 20 ppm to 50,000 ppm of one or more transition metals, from 10 to 10,000 ppm of one or more primary antioxidants, and from 3 wt % to 15 wt % of one or more bio-assimilation promoting additives, wherein the one or more bio-assimilation promoting additives are selected from the group consisting of ethylene vinyl acetate (EVA), polycaprolactone (PCL), Polylactic acid (PLA), Polyhydroxybutyrate (PHB), Polyhydroxyalkanoates (PHA), polybutylene adipate terephthalate, 2-Hydroxypropane-1,2,3-tricarboxylic acid, polybutylene succinate, and combinations thereof. In an embodiment, the one or more primary antioxidants are selected from a phenolic based stabilizer. The master batch composition can also include a secondary antioxidants selected from the group consisting of phosphite based stabilizers.

In still another embodiment, provided herein is a master batch comprising from 80 wt % to 95 wt % of a carrier resin, from 20 ppm to 50,000 ppm of one or more transition metals, pentaerythritol tetrakis(3-(3,5-di-tert-butyl-4-hydroxyphenyl)propionate), tri s(2,4-di-tert.-butylphenyl) phosphite, polycaprolactone ($(C_6H_{10}O_2)_n$), and ethylene vinyl acetate ($(C_2H_4)_n(C_4H_6O_2)_m$). In an embodiment, the master batch comprises low density polyethylene, manganese stearate ($C_{36}H_{70}O_4Mn$), pentaerythritol tetrakis(3-(3, 5-di-tert-butyl-4-hydroxyphenyl)propionate), tris(2,4-ditert.-butylphenyl) phosphite, polycaprolactone ((C$_6$H$_{10}$O$_2$)$_n$), and ethylene vinyl acetate ((C$_2$H$_4$)$_n$(C$_4$H$_6$O$_2$)$_m$). In another embodiment, the master batch comprises about 89 wt % low density polyethylene, about 4 wt % manganese stearate (C$_{36}$H$_{70}$O$_4$Mn), about 4 wt % pentaerythritol tetrakis(3-(3,5-di-tert-butyl-4-hydroxyphenyl)propionate), about 0.5 wt % tris(2,4-di-tert.-butylphenyl) phosphite, about 3 wt % polycaprolactone ((C$_6$H$_{10}$O$_2$)$_n$), and about 3 wt % ethylene vinyl acetate ((C$_2$H$_4$)$_n$(C$_4$H$_6$O$_2$)$_m$).

The formulated additive is introduced into the production cycle of an article of interest at the point of conversion. Suitable routes include extrusion processes such as blown or cast film, injection molding, injection blow molding, rotational molding, or other allied polymer melt processing operations. The additive is included into the final article at a loading of between 1-10% w/w either by means of a pre-blend with the host polymer or through using gravimetric or volumetric feeding devices.

The process of producing an article of interest preferably includes mixing additives into a carrier resin to form a masterbatch as defined above (100). The masterbatch is preferably in the form of pellets. The process preferably further includes mixing the masterbatch with a host polymer to form an end-use polymer mixture (102). The process preferably further includes introducing the end-use polymer mixture into a polymer processing device to form a polymer-based article in a specified shape or format (104). FIG. 1 shows a flowchart including the process steps outlined above. The forming devices used may include, without limitation, devices for making polymer films, devices for making polymer sheets, extrusion blow molding devices, injection blow molding devices, and/or injection molding devices.

Articles made using the masterbatch and process described above include, without limitation, films including stretch wrap, food packaging, cosmetics packaging, pharmaceutical packaging, shrink film, and agricultural films. Other articles made using the masterbatch and process described above include, without limitation, bottles, food containers, furniture, industrial fishing gear, or any rigid item manufactured from polyolefin.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±10%, including ±5%, ±1%, and ±0.1% from the specified value, as such variations are appropriate to perform the disclosed methods.

EXPERIMENTAL

Two example formulations are provided below.

Example 1

Formulation A

Formulation A is a formulation designed for an article that requires functional life for approximately 18 months. One example of such an item would be a grocery bag, which is typically made up of about 80% HDPE and 20% LLDPE. The formulation comprises the following:

Manganese Stearate (C$_{36}$H$_{70}$O$_4$Mn): 4%
Pentaerythritol tetrakis(3-(3,5-di-tert-butyl-4-hydroxyphenyl)propionate): 0.5%
Tris(2,4-di-tert.-butylphenyl) phosphite: 0.5%
Polycaprolactone ((C$_6$H$_{10}$O$_2$)$_n$): 3%

Ethylene Vinyl Acetate ((C$_2$H$_4$)$_n$(C$_4$H$_6$O$_2$)$_m$): 3%
Low density polyethylene 20 m.f.i.: 89%
The Let Down Ratio in raw material for Formulation A=1%

Example 2

Formulation B

Formulation B is a formulation designed for an article that requires functional life for approximately 24 months. One example of such an item would be infant's eating utensil, which is typically made of polypropylene. The formulation comprises the following:

Cobalt Stearate (C$_{36}$H$_{70}$O$_4$Mn): 2%
Pentaerythritol tetrakis(3-(3,5-di-tert-butyl-4-hydroxyphenyl)propionate): 0.5%
Tris(2,4-di-tert.-butylphenyl) phosphite: 0.5%
Polycaprolactone ((C$_6$H$_{10}$O$_2$)$_n$): 3%
Ethylene Vinyl Acetate ((C$_2$H$_4$)$_n$(C$_4$H$_6$O$_2$)$_m$): 3%
Polypropylene 11 m.f.i.: 91%
The Let Down Ratio in raw material for Formulation B=1.5%

Although specific example formulations are provided, other formulations are contemplated for different functional lives for various polymer-based products. The effectiveness of these various formulations can be verified through testing, described in more detail below.

The previously described embodiments of the present disclosure have many advantages. Two of the most important advantages are that use of the masterbatch to make polyolefin-based products (1) preserves the structural integrity of such products for the typical usable life of such products and (2) provides the necessary chemistry in such products for the products to rapidly biodegrade after they have been discarded. The challenge has been to have polyolefin-based products that function well while in use but then biodegrade rapidly when discarded in any type of waste environment, whether aerobic or anaerobic. The various embodiments described herein accomplish that task.

The advantages described above have been verified through testing and analysis. Timing of the biodegradation and bio-assimilation of products made using the formulations described herein are critical, and the formulations may be adjusted depending on the desired functional life of the product being produced using such formulations. Such testing includes a determination of lineic oxidation rate and carbonyl index measurement. Polyolefin has a molecular weight over a broad range of values, but a MW of 250000 is typical. At this molecular weight (MW) it cannot be readily biodegraded by bacterial and fungal activity. By reducing the MW to below 10,000 and thus increasing the hydrophilic properties of the polymer, bacteria and fungi are able to bio-digest the lower MW polymer.

The first step, therefore, in initiating biodegradation, is to reduce the polymer's MW through the action of biodegradable catalysts. The final stage is the biodegradation of the reduced MW polymer by natural microbes. This free radical induced scission of polymer chains results in the formation of a carbonyl group at the point of scission. The chain scission (degradation) of the polymer chain causes a serial reduction in polymer molecular weight which ultimately results in acute embrittlement, micro fragmentation and subsequent availability for biodegradation.

Measurement of the onset and level of carbonyl group development in the test material is a direct measure of the induced degradation of the material by the additive(s) used. It also demonstrates the change from hydrophobic to hydrophilic properties. This degradation can be tracked by the measurement of critical physical properties, using test methods such as ASTM D882 to measure properties such as elongation, but this method is somewhat flawed because as the degradation gets underway the test sample becomes too friable for physical testing. However, because the free radical process initiated by the catalyst(s) causes the formation of a carbonyl group at the point of every scission measurement of the onset and level of this carbonyl group development in the test product is a more accurate direct measure of its induced degradation and capability to biodegrade.

The methodology for this testing includes using FTIR (Fourier-transform infrared spectroscopy) equipment. The height of the carbonyl absorption peak at approximately 1720 cm⁻1 is used (Ac). This is compared to the height of a standard C-H peak attributable to the polymer (for PE this would be at approximately 1460 cm-1) (Ar). The carbonyl index is defined as the ratio of the carbonyl peak height to that of the reference peak.

$$\text{Carbonyl index} = Ac/Ar \qquad \text{Equation 9:}$$

A base line technique is used to calculate the absorbance of the carbonyl group as well as the standard peak. This is done by drawing a straight line (base line) across the base of the peak (taking into account any "shouldering") and intersecting this with a perpendicular line to the top of the peak to determine peak height. This is an extract from a typical methodology as used in an independent laboratory in France:

The photo-ageing test is performed in a Bandol Wheel 400 device for a duration of 36 hours, according to EN 16472, at SEVAR laboratory, located in Bandol, France.

The test parameters are set as follows:

Nominal UV irradiance: 95 W/m²

White HRC, temperature set point 60° C.

Dry cycle (no immersion)

The thermal ageing test is performed in a ventilated oven at 60° C.

To obtain lineic oxidation measurement, the polymer oxidation is determined by FTIR spectroscopy in transmission mode. The spectrometer used is an Avatar 360 (Nicolet) working with the following conditions:

Scans number: 8

Resolution: 4 cm⁻¹

The carbonyl index is measured as the delta of the ratio of the carbonyl peak at 1713 cm⁻¹ and the thickness of the sample in micrometers.

Regarding bio-assimilation, an extract of a Laboratorio Materiali Polimerici Ecocompatibili Italy experiment is provided below. A purpose of the test is to ensure bio-assimilation of plastic fragments by *Rhodococcus ruber* (ATCC 29672) by the detection of Oxidatively Fragmented ¹³C Labelled HDPE containing additive(s) as described in the formulations above. The experimental set-up was based on ASTM D6691/17 and Respirometric Biodegradation Test procedure reported by E. Chiellini et al. (2003; 2007). The tests were conducted in aqueous medium by using ¹³C labeled HDPE (Aged ¹³C HDPE compound) as a tracer substrate; it has been designed to be a time saving method and to help in the elucidation of whether a specific plastic material undergoes transformation processes or whether it is persistent and does not transform (Sander et al., 2019). Moreover, the set-up was also designed to verify and to follow the Bioassimilation process employing hydrocarbon polymer containing pro-oxidant/pro-degradant additive. The Bio-assimilation test was performed by using the bacterial strain *Rhodococcus ruber* (ATCC 29672), reported to be able to degrade plastic material from the literature (Koutny et al in Chemosphere 64 (2006) 1243-1252).

Bio-assimilation Testing and Methodology with Formulation A:

Steps of the bio-assimilation test include measurement of CO₂ with different initial bacterial inocula 10ˆ8 10ˆ4 10ˆ2, measurement of bacterial growth, observation of biofilm via SEM, detection of C13 transfer via NMR, and ecotoxicological assay on the final steps. In this example, Polyethylene (HDPE) with marked ¹³C was synthetized at Ferrara LyondellBasell G. Natta R&D Centre facilities in a lab scale batch reactor with an approximate volume of 4 L. Marked ethylene contained in a pressurized container was fed into a lab scale reactor together with hydrogen. Polymerization took place in the presence of a Ziegler-Natta catalyst and cocatalyst at fixed temperature and pressure for two hours and then discharged and dried to obtain spherical polymer.

The bio-assimilation test included the following steps:

Monoculture at minimum medium of *Rhodococcus ruber* at room temperatures during 240 days (Starting with 10⁸ as inoculum concentration)

Abiotic degradation followed by a characterization of the aged compounds of

Formulation A: ¹³C HDPE (Control) and HDPE reference Preparation of HDPE blends containing 1% by wt. of pro-oxidant/pro-degradant additive (Eclipse™)

In one example experimental test, the biotic degradation was conducted during 240 days at ambient conditions. The main results were obtained by analyzing the first 60 days of the bio-assimilation test. A monoculture of the bacteria was put in a flask equipped with a trap able to chemically capture the carbon dioxide generated during the breathing of the *Rhodococcus*. A good ratio volume of culture/air was maintained during the experiment. The percentage of bio-assimilation obtained under the experimental conditions adopted was 14.1% for the reference samples and 8.3% for the labelled PE. A lower propensity of the bacterial to bio-assimilate the labelled ¹³C was observed.

The Control was less active until the 30th day of biodegradation compared with the blank. This behavior of CO₂ production by the Control means there exists some chemical processes that consume this molecule compared to the blank (wherein the CO₂ is trapped in alkaline solution due to dissolved atmospheric CO₂). This aspect can be explained by considering that the pro-degradant/pro-oxidant catalytic system can actually consume CO₂ at the initiation step and O₂ in the propagation step [Chemosphere 64 (2006) 1243-1252] and thus modify the amount of CO₂ in the local environment inside the respirometer.

A linear trend was observed for Aged ¹³C HDPE compound and Aged HDPE compound reference and data registered from 50 up to 240 days with a positive slope obtained. The positive slope of linear readings of the data registered for Aged ¹³C HDPE compound (0.027) and Aged HDPE compound reference (0.038) indicate that bio-assimilation processes were present.

SS-NMR Analysis was as follows:

$$^{13}CO_2 + H_2O \rightarrow H_2^{13}CO_3 \qquad \text{Equation 10:}$$

$$H_2^{13}CO_3 + 2\ NaOH \rightarrow Na_2^{13}CO_3 + 2H_2O \qquad \text{Equation 11:}$$

$$Na_2^{13}CO_3 + BaCl_2 \rightarrow Ba^{13}CO_3\downarrow \qquad \text{Equation 12:}$$

$$NaOH_{residuo} + HCl \rightarrow H_2O + NaCl \qquad \text{Equation 13:}$$

This result clearly showed the arrival of $^{13}C$ within the *Rhodococcus* colony, thereby demonstrating bio-assimilation.

Bio-assimilation degree was calculated by the assumption that all the organic carbon in the samples can be converted in $CO_2$. By TOC analysis (estimated theoretically from the formula weight) the maximum amount $CO_2$ that theoretically can be evolved during the aerobic biodegradation of the tested materials can be calculated following the reaction:

$$C_{organic} + O_2 \rightarrow CO_2 \qquad \text{Equation 13:}$$

Each mmol (12 mg) of organic-C can be converted to 1 mmol of gaseous $CO_2$. The theoretical maximum amount of $CO_2$ ($CO^{th}$) that can be produced is calculated as reported in $$CO2^{th} = W \times C_{org} \times (44/12) \qquad \text{Equation 15:}$$

Where

W is the weight (mg) of the samples in the respirometer.

$C_{org}$ is the organic carbon (%) in the samples calculated by TOC analyses or by chemical formula for homopolymers.

44 and 12 are the molecular mass of carbon dioxide and the atomic mass of carbon, respectively.

The percentage of the Bio-assimilation (B%) can be calculated by the Equation 15 below as follows:

$$B\% = \frac{\sum (CO_2)_s - \sum (CO_2)_{B.} \times 100}{CO_2^{th}} \qquad \text{Equation 15}$$

Where $\sum (CO_2)_s$ is the amount of carbon dioxide (mg) evolved in respirometer with the samples between the start of the test and time t.

$\sum (CO_2)_B$ is the amount of carbon dioxide (mg) evolved in respirometer without the samples between the start of the test and time t.

$CO_2^{th}$ is the maximum theoretical evolving $CO_2$

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A master batch composition for an article requiring a functional life of approximately eighteen months, consisting of:

a. 4 wt % of manganese stearate;

b. 0.5 wt % pentaerythritol tetrakis (3-(3,5-di-tert-butyl-4-hydroxyphenyl) propionate) as a primary anti-oxidant;

c. 0.5 wt % tris (2,4-di-tert.-butylphenyl) phosphite as a secondary anti-oxidant;

d. 3 wt % polycaprolactone as a bio-assimilation promoting additive;

e. 3 wt % ethylene vinyl acetate as a bio-assimilation promoting additive;

f. 89 wt % low density polyethylene, as a carrier resin; and the master batch composition having a let down ratio in raw material of 1%.

2. A master batch composition for an article requiring a functional life of approximately twenty-four months, consisting of:

a. 2 wt % cobalt stearate;

b. 0.5 wt % pentaerythritol tetrakis (3-(3,5-di-tert-butyl-4-hydroxyphenyl) propionate) as a primary anti-oxidant;

c. 0.5 wt % tris (2,4-di-tert.-butylphenyl) phosphite, as a secondary anti-oxidant;

d. 3 wt % polycaprolactone as a bio-assimilation promoting additive;

e. 3 wt % ethylene vinyl acetate as a bio-assimilation promoting additive;

f. 91 wt % polypropylene, as a carrier resin; and the master batch composition having a let down ratio in raw material of 1.5%.

* * * * *